(12) United States Patent
Broom

(10) Patent No.: US 6,892,831 B2
(45) Date of Patent: *May 17, 2005

(54) METHOD AND APPARATUS FOR BORING THROUGH A SOLID MATERIAL

(75) Inventor: Gilbert R. Broom, Schereville, IN (US)

(73) Assignee: Woodings Industrial Corporation, Mars, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/786,499

(22) Filed: Feb. 24, 2004

(65) Prior Publication Data
US 2004/0163852 A1 Aug. 26, 2004

Related U.S. Application Data

(63) Continuation of application No. 09/601,560, filed as application No. PCT/US99/02202 on Feb. 2, 1999, now Pat. No. 6,732,820, which is a continuation-in-part of application No. 09/018,244, filed on Feb. 3, 1998, now Pat. No. 6,161,633.

(51) Int. Cl.$^7$ .............................................. E21B 17/18
(52) U.S. Cl. ...................................................... 175/320
(58) Field of Search .............................. 175/57, 58, 59, 175/320, 414, 420

(56) References Cited

U.S. PATENT DOCUMENTS

| 1,463,848 A | 8/1923 | Shimin |
|---|---|---|
| 1,477,855 A | 12/1923 | Thurston |
| 1,534,850 A | 4/1925 | Hamilton |
| 1,637,332 A | 8/1927 | Bronson |
| 1,943,880 A | 1/1934 | Rea |
| 2,952,270 A | 9/1960 | Fulton et al. |
| 3,554,306 A | 1/1971 | Wilburn |
| 3,978,931 A | 9/1976 | Sudnishnikov et al. |
| 4,113,405 A | 9/1978 | Dillinger |
| 4,194,581 A | 3/1980 | Walter |
| 4,321,974 A | 3/1982 | Klemm |
| 4,625,814 A | 12/1986 | Helasuo et al. |
| 4,852,672 A | 8/1989 | Behrens |
| 4,895,349 A | 1/1990 | Broom |
| 4,911,729 A | 3/1990 | Rooker |
| 5,020,780 A | 6/1991 | Woodings |
| 5,704,740 A | 1/1998 | Ebenhoch et al. |
| 6,035,953 A | 3/2000 | Rear |
| 6,161,633 A | 12/2000 | Broom |
| 6,220,373 B1 | 4/2001 | Woodings |

FOREIGN PATENT DOCUMENTS

| DE | 1470064 | 4/1977 |
|---|---|---|
| DE | 30 25 890 A1 | 1/1982 |
| EP | 0 383 737 A | 8/1990 |
| GB | 13399 | 5/1906 |
| GB | 1564473 | 4/1980 |
| GB | 2 120 156 A | 11/1983 |
| WO | WO 95/29030 | 11/1995 |

OTHER PUBLICATIONS

McMaster–Carr Supply Company–Catalog 99 ("Wood Boring Bits Deep–Hole Power Auger Bits", pp. 1837–1842.).

Primary Examiner—William Neuder
(74) Attorney, Agent, or Firm—Buchanan Ingersoll, P.P.C.

(57) ABSTRACT

A rotary drill bit for drilling a hole through a solid body is disclosed. The drill bit includes a collar and a penetrating member. At a proximal end, the collar is attachable to a drill shaft. At a distal end, the collar is attachable to the penetrating member. The penetrating member has a connecting end for attachment to the collar and a cutting end for engaging the solid body. A pilot drill is fixedly attached to the cutting end for initiating contact with the solid body.

18 Claims, 4 Drawing Sheets

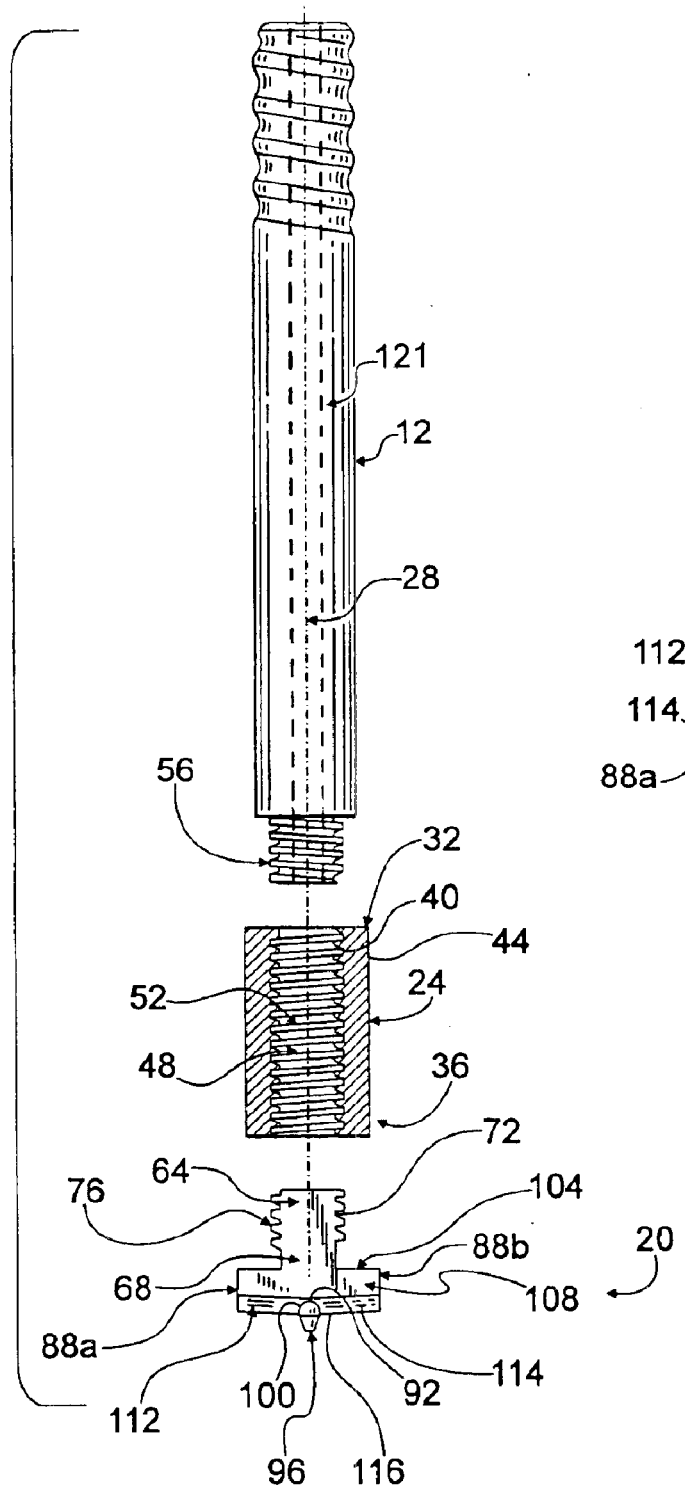
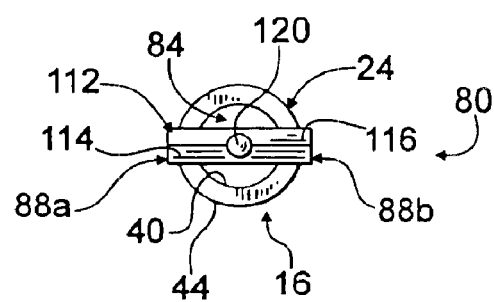
Fig. 2
Fig. 3

METHOD AND APPARATUS FOR BORING THROUGH A SOLID MATERIAL

CROSS-REFERENCE TO RELATED APPLICATIONS

This application is a continuation application of patent application Ser. No. 09/601,560 filed on Aug. 3, 2000, U.S. Pat. No. 6,732,820 which is a § 371 application of International Application No. PCT/US99/02202 filed on Feb. 2, 1999, which is a continuation-in-part application of patent application Ser. No. 09/018,244 filed on Feb. 3, 1998, now U.S. Pat. No. 6,161,633, the entire disclosures of which are incorporated by reference herein.

FIELD OF THE INVENTION

The present invention relates to a method and apparatus for boring through a solid body. More particularly, the invention relates to an improved rotary drill bit for boring holes with increased efficiency through difficult to penetrate materials.

BACKGROUND OF THE INVENTION

There are different drill bits for drilling through a variety of solid materials. Many of these drill bits are designed for particular applications. For instance, drill bits have been designed to drill through wood, metal, and concrete. In order to drill through these different materials, designers have varied the material used to produce the drill bits, the shape of the drill bits, and the speed with which the drill bit is operated.

One problem existing with many drill bits is the rate at which they will drill a hole is too slow. When the material to be drilled is difficult to penetrate, the process of boring a hole may take as long as several minutes. It is often important to maximize the efficiency at which a hole can be bored into a given material in order to improve manufacturing productivity. Such is the case in drilling tap holes in metal purifying blast furnaces.

The first step in producing steel sheet which is used in the building and construction industry, the automotive industry, the appliance industry, the electric motor industry, etc., is to produce relatively pure iron from iron ore. This process is carried out within a blast furnace. In order to maximize the productivity of a steelmaking facility, as much pure iron as possible must be produced. Many resources are expended in developing methods and procedures to increase the amount of pure iron which can be produced annually.

In developing these methods and procedures, every manufacturing variable in the blast furnace process is optimized. One of these variables is the rate at which the blast furnace can be tapped to drain molten iron from the furnace. A typical blast furnace is tapped from seven to twelve times per day seven days a week. The typical blast furnace tap hole takes several minutes to drill. In fact, some tap holes take as long as fifteen minutes to drill.

The rate at which the tap hole is drilled is adversely affected by drill bit "walking". Walking occurs as the drill bit first meets the material to be drilled, it slides or skids laterally rather than boring into the material. Therefore, drill bit walking prevents the drill operator from initiating the drilling process.

The drilling process is also slowed by drill bit binding. Binding occurs when loosened debris created in the drilling process builds within the hole. The debris accumulates around the drill bit and freezes the drill bit within the hole preventing the drill bit from rotating within the hole.

In order to solve some of these problems, certain drill bits have been designed which have air passages. Pressurized air is forced through the passages toward the drill bit/solid body interface to blow the debris away from the drill bit and prevent binding. However, when the hole is to be drilled has a substantial length, as is the case with a blast furnace tap hole, the debris continues to build because it cannot escape the hole.

The present invention is provided to solve these and other problems.

SUMMARY OF THE INVENTION

The present invention is directed to a rotary drill bit for boring a hole through solid materials. The drill bit of the present invention has interchangeable parts and increases the rate at which a hole can be drilled.

The drill bit comprises a collar and a penetrating member. The collar is attachable at a proximal end to a drill shaft and at a distal end to the penetrating member. The collar is generally centered about a longitudinal axis and has a cylindrical shape. An inner surface of the collar defines a chamber. In addition, the inner surface is furnished with reverse or lefthand oriented threads.

The penetrating member comprises a connecting end and a cutting end. The connecting end is attachable to the distal end of the collar. The connecting end has a pair of opposing planar walls joined by a pair of opposing arcuate threaded walls. The treads on the arcuate walls are reverse oriented for attachment to the reverse threads located on the inner surface of the collar. The arcuate walls have a length less than the length of the planar walls so that the cutting end has a narrow profile.

The cutting end has a pair of spades radiating from a center point. A pilot drill for creating a pilot hole is also located at the center point. Each spade has a pentagonal cross-section. Accordingly, each spade has a base wall, opposing side walls, and a pair of angled walls that intersect to form a cutting edge.

Other advantages and aspects of the present invention will become apparent upon reading the following description of the drawings and detailed description of the invention.

BRIEF DESCRIPTION OF THE DRAWINGS

FIG. 2 is an exploded view of the cross-sectional view of FIG. 1;

FIG. 3 is a view taken along line 2—2 of FIG. 1;

DETAILED DESCRIPTION OF THE INVENTION

Figure 1:
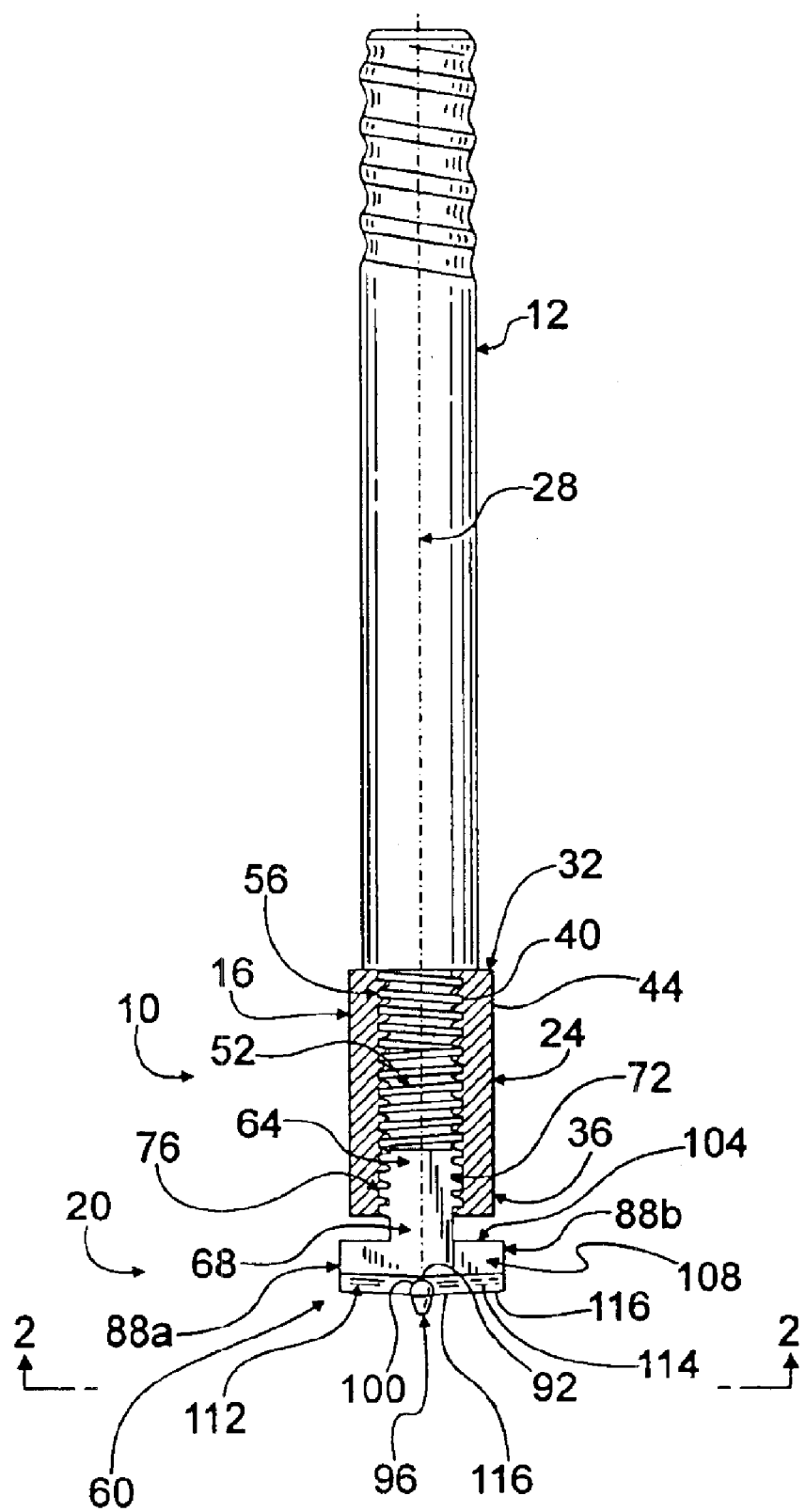
FIG. 1 is a cross-sectional view of a drill bit of the present invention connected to a drill shaft.

While the invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a drill bit 10 for boring a hole through a solid body is illustrated. The drill bit 10 of FIG. 1 is shown joined to a shaft 12. The drill bit 10 comprises a collar 16 removably attached to a penetrating member 20. This feature allows the collar 16 or the penetrating member 20 to be switched out depending upon the wear to that part or the type of material to be drilled.

The collar 16 is generally produced from a rigid metallic material. The collar 16 has a cylindrical side wall 24 centered about a longitudinal axis 28, a proximal end 32 and a distal end 36. Alternatively, the collar 16 can be produced with a triangular, square, rectangular, pentagonal, hexagonal, octagonal, or other similarly shaped side wall. The side wall 24 has an inner surface 40 and an outer surface 44. The inner surface 40 defines a chamber 48 for receiving the shaft 12 at the proximal end 32 of the collar 16. The inner surface 40 is furnished with a first set of reverse threads 52. The reverse threads 52 are oriented so that a counterclockwise torque fastens and tightens the collar 16 to a corresponding threaded portion 56 of the shaft 12.

The penetrating member 20 comprises a cutting end 60 and a connecting end 64. The connecting end 64 has opposing planar side walls 68 joined by opposing arcuate side walls 72. The arcuate side walls 72 are furnished with threaded portions 76. These threaded portions 76 also have a reverse orientation so that the connecting end 64 can be joined to the distal end 36 of the collar 16.

Each arcuate side wall 72 has a length which is less than the length of the planar side walls 68. FIG. 3 shows that this arrangement lends the penetrating member 20 a narrow profile 80. When the penetrating member 20 is inserted into and threadably attached to the collar 16 there are air gaps 84 on either side of the penetrating member 20. The purpose of the air gaps 84 will become clear on further description.

The cutting end 60 is designed to bore through the solid body and is generally suitable for drilling through tough materials such as concrete and/or steel. The cutting end 60 comprises identical first and second spades 88 radiating from a center point 92. A pilot drill 96 is positioned at the center point 92.

The pilot drill 96 is a conical portion centered about the longitudinal axis 28. The pilot drill 96 blends into the remaining portions of the penetrating member 20 forming a smooth transition region 100. The pilot drill 96 is the first portion of the drill bit 10 to contact the solid material which is to be drilled. This pilot drill 96 penetrates the body forming an initial pilot hole and aids in guiding the drill bit 10 through the body. In other words, the pilot drill 96 acts as an anti-walk mechanism because as the pilot drill 96 enters the solid body and forms the pilot hole the remaining portions of the drill bit 10 cannot drift out of position. The anti-walk mechanism increases the rate at which a hole can be drilled because less time is wasted aligning the drill bit with the targeted drill area.

The spades 88 have a pentagonal cross-section. Each spade 88 has a base wall 104, a pair of side walls 108, and a pair of angled walls 112. A portion of each base wall 104 is integrally connected to the connecting end 64 of the penetrating member 20. The pair of opposing side walls 108 extend perpendicularly from the base wall 104. A portion of each side wall 108 is integrally connected and coplanar with the planar side wall of the connecting end 64 so that the penetrating member 20 maintains its narrow profile 80 at the cutting end 60. At an opposite side of the base wall 104, the angled walls 112 extend from each cutting end 60 side wall 108. The angled walls 112 form a beveled cutting surface 114 and extend upwardly and inwardly until the angled walls 112 meet forming a cutting edge 116. Thus, the cutting edge 116 is formed by the union of the pair of angled walls 112. Thus, each spade 88 has a cutting edge 116.

The cutting edges 116 are those portions of the penetrating member 20 that perform the bulk of the drilling. The size of the hole to be bored corresponds roughly to the total length of the cutting edges 116 plus a diameter 120 of the pilot drill 96. Each cutting edge 116 extends outwardly from the center point 92 and tapers downwardly toward the base wall 104. The downwardly tapering cutting edges 116 cooperate with the pilot drill 96 to facilitate movement of the solid material and to prevent the drill bit from walking or shifting along the solid material's surface as the hole is being bored.

The drill bit 10 of the present invention can be employed in conjunction with a solid shaft 12 without having binding occur. Having the cutting edges 116 extend beyond the outer surface 44 of the collar 16 allows debris to be removed from the hole without the use of pressurized air. Therefore, when drilling through a known carcinogenic material, blowing is not needed to avoid drill bit 10 binding. However, the shaft 12 can include a conventional passage 121 to permit pressurized air to be forced through the air gaps 84.

Figure 4:
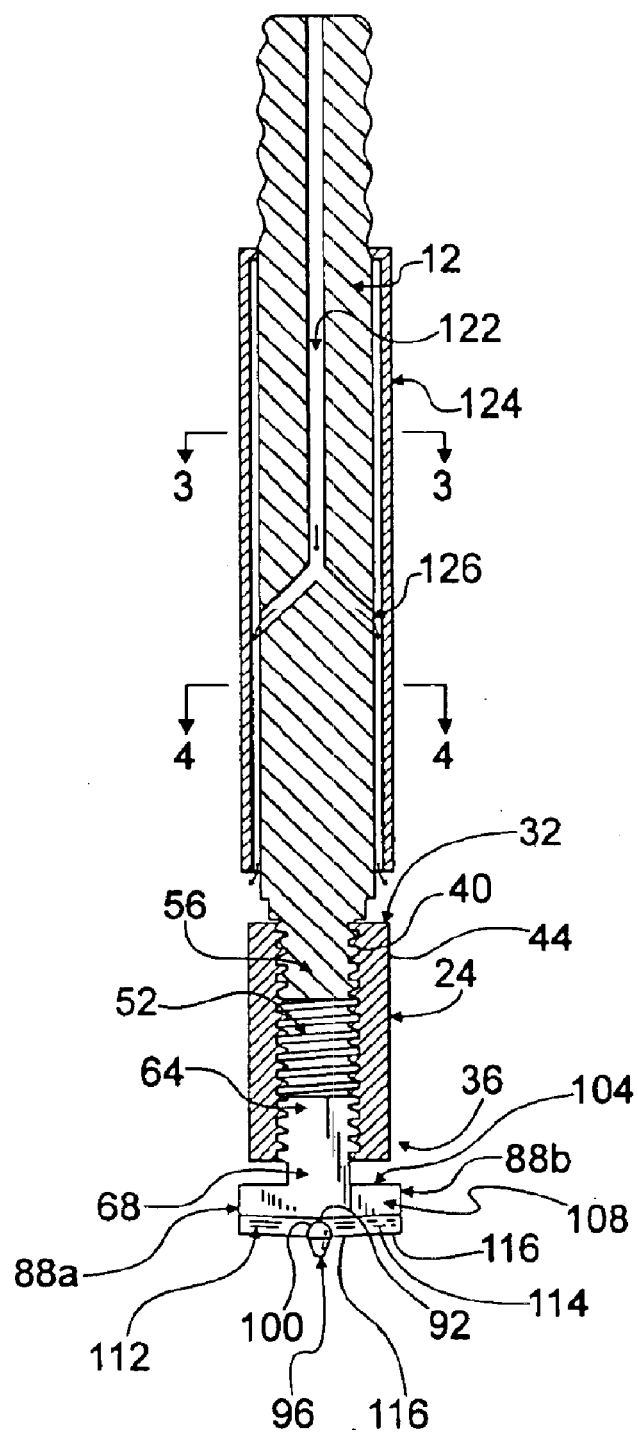
FIG. 4 is a cross-sectional view of a drill bit of the present invention.
Figure 5:
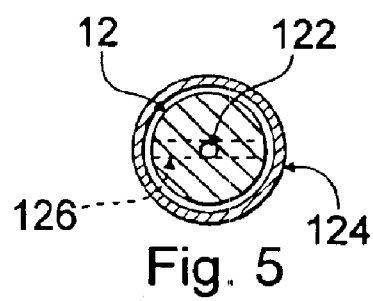
FIG. 5 is a view taken along line 3—3 of FIG. 4.
Figure 6:
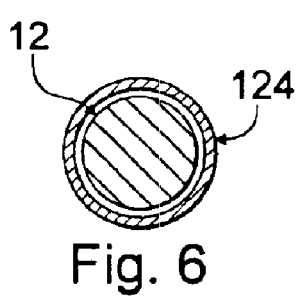
FIG. 6 is a view taken along line 4—4 of FIG. 4.

In an alternative embodiment shown in FIGS. 4 through 6, pressurized air is forced through a passage 122 which extends partially down the axial length of the shaft 12. The pressurized air is used to blow off loosened debris of the solid body created during the drilling process that, if allowed to build up, could bind the drill bit 10 as the hole is being drilled. Drill bit binding causes delays in the drilling process. Thus, by blowing off the debris and avoiding drill bit binding, the rate at which a hole can be drilled is increased. The pressurized air also acts to cool the drill bit and shaft and further prevents the drill bit and shaft from annealing.

In this embodiment, an outer sleeve 124 is fixedly attached to an end of the shaft 12. At an opposite end of the shaft 12, the sleeve 124 is not fixedly attached. The shaft 12 passes through the interior of the sleeve 124. The sleeve 124 is spaced a distance from the shaft 12 so that the shaft 12 is approximately centered within the sleeve 124. As pressurized air is introduced through the passage 122, it passes through the interior of the shaft 12 until the air reaches an outlet 126 between the fixed and free ends of the sleeve 124. The air then travels down along the shaft 12 through the space between the shaft 12 and the sleeve. The air is then expelled from the space at the free end of the sleeve 12 to blow off debris. This arrangement prevents drill bit binding, and the pressurized air also cools the drill bit as it is boring the hole. This arrangement also reduces the amount of debris that goes airborne during blow off.

The cutting edges 116 extend radially beyond the outer surface 44 of the collar 16. Thus, the circumference of the hole being drilled is greater than the circumference of the collar 16. This structure cooperates with the air gaps 84 on either side of the penetrating member 20 and the pressurized air passed through the passage in the shaft 12 to aid in preventing the drill bit 10 from binding up within the hole. As the pressurized air is forced through the passage and the outlet and along the shaft 12, it is forced out of the free end of the sleeve 124 and blows the debris away as the hole is being drilled. The loosened debris is expelled from the drilling area along the outer surface 44 of the collar 16. The air gaps 84 help circulate the air within the hole being bored.

Figure 7:
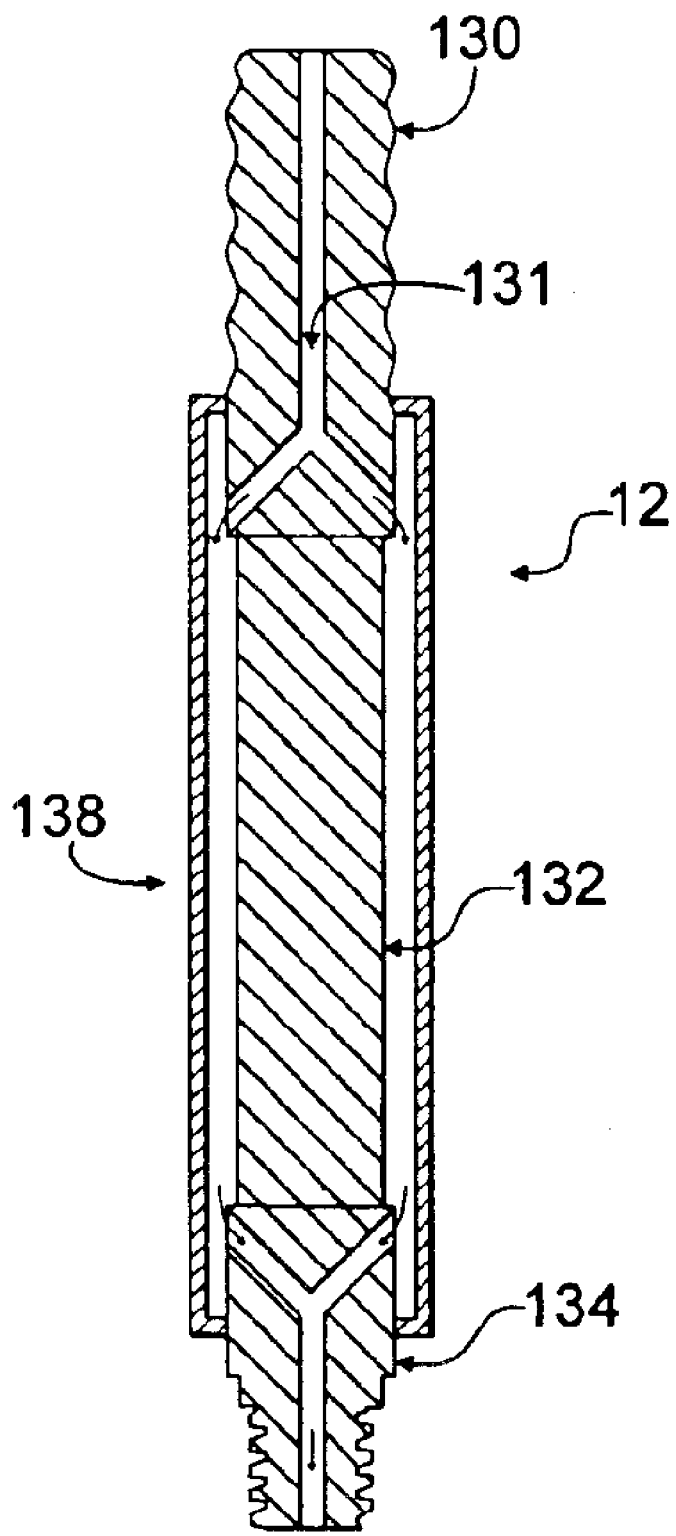
FIG. 7 is a cross-sectional view of an embodiment of the present invention.

FIG. 7 illustrates yet another embodiment. In the embodiment illustrated in FIG. 7, the drill shaft 12 is sectioned into a distal end 130 having a fluid pressure port 131, a solid intermediate section 132, and a proximal end 134 having a fluid pressure vent 136. A partial sleeve 138 surrounds the intermediate section 132 and portions of the distal end 130 and proximal end 134. A disparity in the diameters of the sleeve 138 and the shaft 12 allow the fluid pressure to travel in through the port 131, down the solid intermediate section 132, and out the vent at the distal end 130.

While specific embodiments have been illustrated and described, numerous modifications are possible without departing from the spirit of the invention, and the scope of protection is only limited by the scope of the accompanying claims.

I claim:

1. A rotary drill bit for boring through a solid body, the rotary drill bit comprising:

a hollow drill shaft having a penetrating member attached to a first end; and a sleeve positioned around a portion of the drill shaft defining a duct wherein a fluid pressure can be delivered to the drill site through the duct between the sleeve and drill shaft.

2. The rotary drill bit of claim 1, wherein the penetrating member has a cutting edge including a pilot drill.

3. The rotary drill bit of claim 2, further comprising a collar having a proximal end and a distal end for connecting the penetrating member to the drill shaft.

4. The rotary drill bit of claim 3, wherein the collar has an inner surface and an outer surface, the inner surface having a first threaded segment and defining a chamber, and the penetrating member has a second threaded segment located at the connecting end for engaging the first threaded segment of the collar wherein the connecting end is threadably attached to the collar.

5. The rotary drill bit of claim 4, wherein the second threaded segment comprises opposing first and second threaded, arcuate walls separated by first and second substantially planar walls.

6. The rotary drill bit of claim 5, wherein a length of the first and second threaded, arcuate walls is less than a length of the first and second substantially planar walls wherein a pair of air gaps are formed between the inner surface of the collar and the substantially planar walls.

7. The rotary drill bit of claim 1, wherein the shaft includes a passage for accepting the fluid pressure.

8. The rotary drill bit of claim 7, wherein the passage has an inlet for accepting the fluid pressure and an outlet for delivering the fluid pressure to the drill site.

9. The rotary drill bit of claim 8, wherein the outlet is located within a portion of the drill shaft covered by the sleeve.

10. A rotary drill bit for boring a hole through a solid body, the rotary drill bit comprising:

a drill bit;

a hollow drill shaft having a proximal end, an intermediate section, and a distal end, the proximal end including a port for accepting a fluid pressure from an external source, and the distal end including a vent for delivering the fluid pressure to a drill site; and a sleeve surrounding the intermediate section and at least a portion of the distal and at least a portion of the proximal end wherein a disparity in diameters of the sleeve and the drill shaft allow the fluid pressure to travel in through the port, down the intermediate section, and exit the vent at the distal end.

11. A drill bit shaft comprising:

a hollow elongated member having a first end and an opposing second end attachable to a drill bit, the elongated member comprising a passage, the passage including an inlet located at the first end for accepting a fluid pressure into the passage and an outlet located between the first and second ends of the elongated member through which the fluid pressure exits the passage; and a sleeve positioned around a portion of the elongated member including the passage outlet, a portion of the sleeve being spaced from the elongated member to provide a duct between the sleeve and the elongated member wherein the fluid pressure exiting the outlet is delivered toward the second end of the elongated member through the duct.

12. The drill bit shaft of claim 11, wherein the sleeve includes a fixed end adjacent the first end of the elongated member and attached thereto, and a free end adjacent the second end of the elongated member wherein the fluid pressure exits the duct through the free end.

13. A drill bit shaft comprising:

a hollow elongated member comprising a proximal end, an intermediate section, and a distal end, the proximal end including a port for accepting a fluid pressure from an external source, and the distal end including a vent for delivering the fluid pressure to a drill site; and a sleeve surrounding a portion of the elongated member including the intermediate section and at least a portion of the distal and at least a portion of the proximal end, the sleeve spaced a distance from the elongated member for providing a fluid communication duct between the port and the vent wherein the fluid pressure can travel through the port, down the duct along the intermediate section, and exit the vent at the distal end.

14. A drill rod for use with drilling apparatus having a compressed air system for blowing compressed air through such drill rod to purge drilling debris from a hole being drilled, said drill rod comprising an elongated hollow steel bar having at least one side wall and a first end threaded to permit attachment thereof to said drilling apparatus, and a second end threaded to receive a drill bit, a tubular sleeve axially disposed around said steel bar to form a chamber between said steel bar and said tubular sleeve, the length of said tubular sleeve being insufficient to overlay the first and second threaded ends of said steel bar, a first end of said tubular sleeve adjacent to said first end of said steel bar being joined to said steel bar to seal a first end of said chamber, and an aperture through said at least one side wall under said tubular sleeve and adjacent to said sealed end of said annular chamber, said aperture communicating between said first end of said steel bar and said chamber, such the compressed air applied at said first end of said steel bar will pass therefrom and exit through said chamber adjacent to said threaded second end of said steel bar.

15. The drill rod of claim 14, wherein said steel bar and said tubular sleeve are cylindrical and the chamber formed therebetween is an annular chamber.

16. The drill rod of claim 14, wherein said aperture is formed by an axial hole in said first end of said steel bar in communication with a substantially radial hole through said at least one side wall of said steel bar.

17. A method of making a drill rod for use with drilling apparatus having a compressed air system for blowing compressed air through such drill rod to purge drilling debris from a hole being drilled, said method comprising the steps of:

a. threading a first end of an elongated hollow steel bar to permit attachment thereof to said drilling apparatus;

b. threading a second end of said steel bar to permit attachment of a drill bit;
c. providing an aperture through said steel bar communicating between a side surface of said steel bar and said first end of said steel bar;
d. placing a tubular sleeve axially around an outer surface of said steel bar to form an annular chamber between said steel bar and said tubular sleeve, the length of said tubular sleeve being insufficient to overlay the first and second threaded ends of said steel bar; and
e. joining a first end of said tubular sleeve adjacent to said first end of said steel bar to seal a first end of said annular chamber.

18. The method of making a low cost drill rod of claim 17, wherein said aperture is formed by drilling an axial hole into said first end of said steel bar which intersects with a radial hole drilled into a side of said steel bar.

* * * * *